Dec. 5, 1961   P. NELLI ET AL   3,012,243
COLLISION PREVENTING SYSTEM
Filed Dec. 29, 1958   3 Sheets-Sheet 1
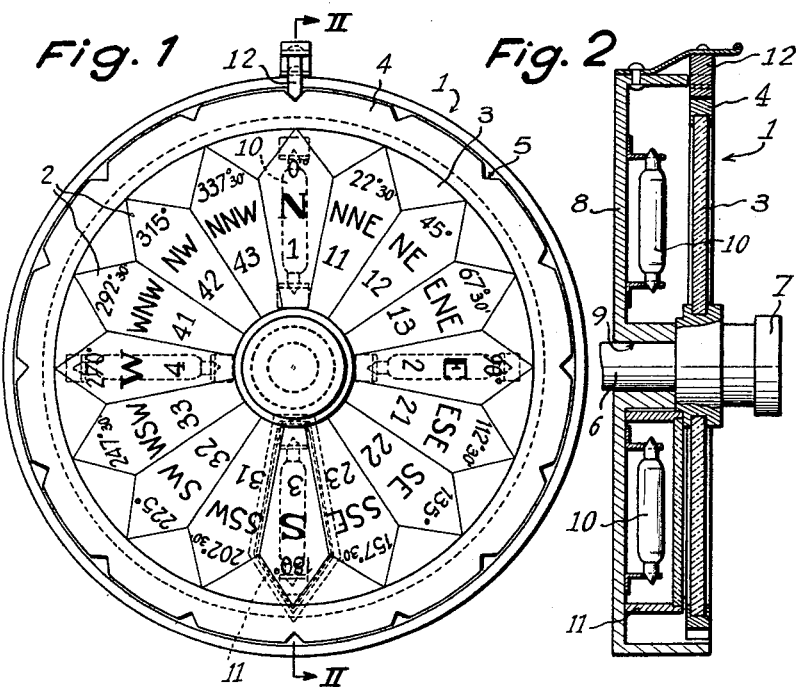
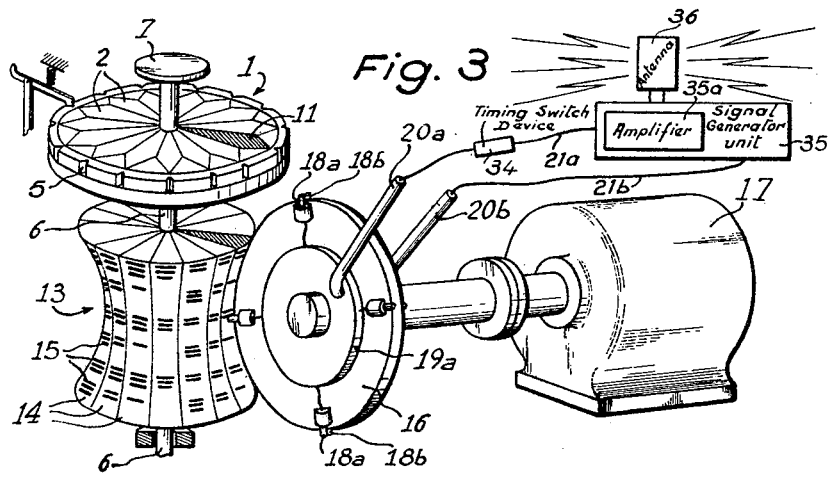

Dec. 5, 1961   P. NELLI ET AL   3,012,243
COLLISION PREVENTING SYSTEM
Filed Dec. 29, 1958   3 Sheets-Sheet 2

3,012,243
COLLISION PREVENTING SYSTEM
Pierre Nelli, 34 Ave. du Marechal Maunoury, Blois, France, and Rene Pugnet, 42 Rue du Val de Saire, Cherbourg, France
Filed Dec. 29, 1958, Ser. No. 783,472
Claims priority, application France Dec. 28, 1957
5 Claims. (Cl. 343—106)

This invention relates to navigational systems of the type more particularly adapted to avoid collisions between craft. While more especially designed for use in connection with sea craft the teachings of the invention are fundamentally applicable to aircraft and the like as well.

In order that two craft near enough to be in danger of running foul of each other should be capable of effecting an avoidance maneuver, it is only necessary that each craft should be aware of the bearing of, and the course followed by, the other. The usual procedure at sea is to determine the bearing of the other vessel by means of an alidade, a sight-rule or the like. If successive readings made at different times give equal results, there is a danger of collision. In such event the course and bearing of the respective vessels determined usually by sight indicates which is to execute the avoidance maneuver and in which direction such maneuver is to be performed in accordance with the rules of navigation.

However in cases where visibility is poor due to weather, smokescreen or any other reason, the navigator must rely on sound signals emitted by other ships and such signals are only very vaguely indicative of bearing and course.

In recent years radio navigations equipment including radar has been developed. This elaborate and complex equipment owing to its very complexity and the great number of component parts is subject to unpredictable maladjustment and failure, and its operation is liable to be disturbed by adverse atmospheric conditions, jamming and other causes. In fact, while the introduction and wide extension of radar equipment in recent years has reduced the frequency of collision between craft, the records show that the hazard has not been eliminated by far and a considerable number of collisions, are known to occur at this time between ships, both of which are carrying radar equipment.

Therefore, objects of this invention are to provide an improved, simplified and reliable navigational aid, capable of indicating both the bearing and course (or heading) of a craft, and thereby to provide a trustworthy means of avoiding collision between craft under conditions of poor visibility. Another object is to provide a simplified short-range radio transmitter for craft, whereby any other craft within a dangerous range will be immediately and accurately informed of the position and course of the transmitting craft. Another object is to provide improved means for transmitting coded information. Other objects will appear.

In accordance with an aspect of the invention, radio transmitting means according to the invention are provided on board a transmitter craft for omnidirectionally transmitting code signal groups each comprising a predetermined combination of a limited number of identical code elements for indicating the course or heading of the craft, and receiving means including a direction finding antenna is provided for receiving corresponding signals transmitted from other craft, whereby each craft will be made cognizant by means of these respective agencies both of the heading or course and bearing of any other craft within range.

More specifically, the invention contemplates generating on board one ship, by means of a generator controlled in response to the course of said ship, code signals indicative of the course. Such course signals are transmitted repetitively a certain number of times in succession during relatively short periods preferably separated by comparatively long silent periods. The timed code signals thus generated are broadcast as radio waves over a predetermined regulation frequency by means of an antenna having adjustable electrostatic screen means for limiting its range of transmission, so that such signals are receivable by any other vessel within such range, by means of a directional receiver antenna, whereby the receiver ship will be made cognizant of the course of the transmitter ship by decoding the code signals received, and will be simultaneously made aware of the transmitter ship's bearing as indicated by the angular setting of the receiving antenna.

According to a further feature of the invention, the aforementioned code signals may be used to indicate, approximately the speed of the transmitter craft at the same time as they accurately indicate the heading or course of it. In this connection, it is convenient to divide seacraft into at least three speed categories according as their cruising speed is slow, moderate or fast, and to ascribe to each such category a different predetermined value of a suitable selected parameter characterizing the transmitted signals. Such parameter may for example constitute an audio modulating frequency for such signals whereby the low, intermediate or high pitch of the received demodulated signal will indicate that the transmitter craft is respectively slow, moderate-speed or fast. Other suitable parameters in this connection might comprise the repetition rate of the identical signal trains, or the number of times the heading code signal is repeated in each unitary train, or the duration of the silent period between identical code signals within each train, or the duration of the silent period between transmission of the identical code signals comprising each heading signal. The values of the selected parameter regardless of its particular nature which correspond to the respective speed categories should be selected in some simple, immediately recognizable ratio, such as the ratio 1, 2, 3.

Apparatus according to the invention for working the novel method of navigation may comprise in combination, at the transmitter end, manual means for setting the course or heading of the ship, an automatic signal generator unit controlled in response to the course setting means to generate code signal trains representing the set course or heading, a timing unit for controlling the relative time periods over which such signal trains are transmitted as well as the intervening silent periods, and antenna means for radiating said signals during said transmission periods said antenna including an adjustable electrostatic screen device for limiting its range. Receiving antenna means of the direction-finding type for reception of similar signals transmitted from other craft is standard equipment on practically all seagoing vessels.

In order for the system of the invention to have wide and effective utility in practice, it is necessary that a number of requirements be simultaneously met. It should be fully automatic so as not to require additional personnel for operating it; it should be simple to manufacture and maintain so as to be reasonably-priced and reasonably failure-proof; it should allow of practically instantaneous and error-proof interpretation of the information conveyed by the signals; and it should not interfere with other forms of radio transmission.

One suitable constructional form meeting the above requirements will now be described for purposes of illustration but not of limitation with reference to the accompanying drawings, wherein:

FIGURE 1 is a plan view of a manual course setter device showing a dial in the form of a compass rose;

FIGURE 2 is a section on line II—II of FIGURE 1;

FIGURE 3 is a diagrammatic general perspective view of signal generating and transmitting equipment according to the invention;

Figure 4:
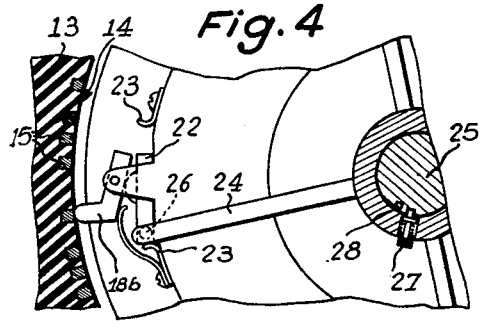
FIGURE 4 shows a fragmentary detail of FIGURE 3 illustrating the reading or sensing means thereof.

First referring to FIGURE 3 for a general description of the invention, a transmitter assembly comprises a drum 13, angularly adjustable around its longitudinal axis and adapted to be manually positioned by means of a course setter device 1 to each of sixteen angular settings corresponding to the principal subdivisions of a compass-rose. The drum has an arcuately concave side periphery which is angularly divided into sixteen longitudinal bands 14 respectively corresponding to said sixteen compass divisions or settings. Each band contains a longitudinal array of code indicia 15 recorded along it, e.g. in the form of conductive strips on the insulating surface of the drum with the array in each longitudinal band 14 constituting a code representation of the corresponding compass direction in accordance with an arbitrarily predetermined code. Cooperating with the drum is a rotatable disc 16 having a radius corresponding to that of the arcuate generatrice of the drum and rotated in a diametric plane of the drum by a constant-speed motor 17. The disc 16 carries contact brushes 18a and 18b which sense the code pattern recorded on the particular band of the drum presented to the disc. These contact brushes 18a and 18b and the timing switch device 34 control, for each code element of the band, the voltage pulse generated by the signal generator unit 35. The resulting code pulses are amplified by the amplifier part 35a, of unit 35, and radiated into space as radio waves by means of a limited-range omnidirectional antenna 36. The invention will now be described in further detail.

Referring to FIGURES 1 and 2, the course setter device comprises a compass dial 1 subdivided into sixteen sectors each representing 22°30′ in angular extent. To each of these sectors there is ascribed an arbitrary numerical code designation. While an unlimited variety of suitable codes can of course be devised, one suitable and simple form utilizes only the first four digits of the decimal number system. Thus the four main directions north, east, south and west are respectively designated as 1, 2, 3 and 4. In each of the four quadrants commencing with the four cardinal points, the initial 22°30′ sector is designated by the same numeral as said point, i.e. 1, 2, 3 or 4. Each of the remaining three 22°30′ sectors of the quadrant is designated by the same numeral followed by the numeral 1, 2 or 3 respectively. Thus in the first quadrant the four sectors N, NNE, NE, ENE are respectively designated by code numbers 1, 11, 12 and 13; and so forth. Further, each of the four digits 1, 2, 3 and 4 is represented within the corresponding signal as the corresponding number of dots. The above described code is summarized in the following table:

| | Heading | Code number | Code signal |
|---|---|---|---|
| First quadrant | N | 1 | . |
| | NNE | 11 | . . |
| | NE | 12 | . .. |
| | ENE | 13 | . ... |
| Second quadrant | E | 2 | .. |
| | ESE | 21 | .. . |
| | SE | 22 | .. .. |
| | SSE | 23 | .. ... |
| Third quadrant | S | 3 | ... |
| | SSW | 31 | ... . |
| | SW | 32 | ... .. |
| | WSW | 33 | ... ... |
| Fourth quadrant | W | 4 | .... |
| | WNW | 41 | .... . |
| | NW | 42 | .... .. |
| | NNW | 43 | .... ... |

It will be noted in the above table that a number of unused two-digit combinations between the four code digits are available, namely 14, 24, 34, 44 for designating if desired additional information which can be transmitted together with the heading signals, such as "ship at anchor," "adrift," and so on.

The central portion 3 of the dial 1 is made of transparent material and is inserted in a peripheral metal ring or bezel 4 formed with notches 5 registering with each of the sixteen sectors. The dial 1 is secured on a shaft 6 having a manual course setting knob 7 at its top.

The code dial is enclosed within a stationary case 8 having means for rotatably supporting the shaft 6 in an axial bore 9 of the case. Lamps 10 mounted in the casing serve to illuminate the central transparent portion 3 of the dial. One of the bulbs 10 may be mounted within an enclosure 11 corresponding in contour to that of each of the sectors 2 and which enclosure has its side directed towards the dial 1 covered by a plate of red or other colored glass to provide a reference position or marker. To set the system for a particular ship's course or heading the knob is rotated to bring the corresponding sector of the dial 1 into register with this reference marker 11 illuminated in red. In order to rotate the dial 1, a locking detent 12 projecting from the casing 8 is first lifted out of the notch 5 in which it was positioned and is allowed to drop back into the notch corresponding to the newly set course. Advantageously the transparent dial portion 3 other than the area registering with the reference position is illuminated in blue to avoid glare.

Referring to FIGURE 3 as already briefly indicated the shaft 6 supporting the dial 1 also fixedly supports thereon the drum 13 having arcuate concave generatrices, the lateral surface of which drum is divided into sixteen bands of equal angular width corresponding to the dial sectors. The drum surface is made of insulating material and in the surface of each band are inserted conductive strips 15 arranged in patterns corresponding to the code numbers of the sector to which the particular band relates.

Mounted for rotation in the radial plane of the drum and dial on which the reference marker 11 extends, is the scanning disc or rotary switch disc 16, equal in radius to the radius of a generatrix of the drum so that a portion of the disc periphery will nest with the side of the drum regardless of the particular angular setting of the dial and drum. The disc is secured on the shaft of an electric motor 17. The discs 16 is generally made of insulating material or has a coating of such material and supports at spaced points on its periphery the pairs of contact brushes 18a and 18b which are respectively connected with conductive/connector flanges 19a and 19b (the latter not visible on the drawing) secured to opposite sides of the disc. Sliders 20a and 20b frictionally engaging the flanges 19a and 19b respectively are connected to leads 21a and 21b of the signal generator unit 35. The adjacent pairs of brushes 18a—18b are so spaced around the circumference of the disc that their angular spacing corresponds to the angular extent of the generatrices of the drum 6. Thus, if the angular extent of the generatrix of the drum is one nth part of a circumference, the pairs of brushes 18a—18b would be positioned at the apices of a regular polygon having n sides. In the illustrated example such polygon is a square, i.e. the angular extent of the drum generatrix is assumed to be 90°.

In operation of the system so far described, assuming a change in ship's course an operator sets the new course on the course setter of the system by bringing the corresponding compass indication into the red-illuminated reference sector 11 by means of knob 7. This results in rotating the drum 13 to bring the corresponding arcuate band 14 carrying the code designation of the new course into the path of the switch brushes 18a—18b. Means are provided whereby the brushes will not interfere with the drum setting operation. For this purpose, as shown in FIGURE 4, each brush such as 18b is pivotally mounted for rotation towards and away from the drum surface, and the brush includes a surface which is urged by a leaf spring, as shown, to its projecting position into contact with the drum periphery. The brush can be pivoted to its retracted position in opposition to the spring by the action of a small slider member 22 associated with each brush and having projection thereon engaging the brush so that shifting the slider 22 along the disc periphery by a small amount as determined by limit stops 23 in either direction will move the related brush to its projected operative position, or to its retracted inoperative position. Each slider 22 has its one end pivoted to a radial arm 24 made of insulating material. All the radial arms such as 24 on each side of the disc have their inner ends secured to a related hub member freely rotatable on the shaft 25 to which the disc 16 is secured. Spring detent means 27 on the hub cooperate with a pair of notches 28 in the shaft 25 for reelasably locking the assembly in either one of two positions in which the brushes are respectively placed in their operative and in their inoperative positions. Thus to alter the setting of the dial drum, the drive motor 17 is stopped or alternatively, the disc may be disconnected from the motor by suitable clutch means if preferred, and the means just described are actuated to pivot the brushes to their retracted inoperative positions whereupon the new setting is introduced, the brushes are pivoted back to their projected operating positions and the disc 16 is again started in rotation; the entire operation requires only a few seconds to perform.

Figure 5:
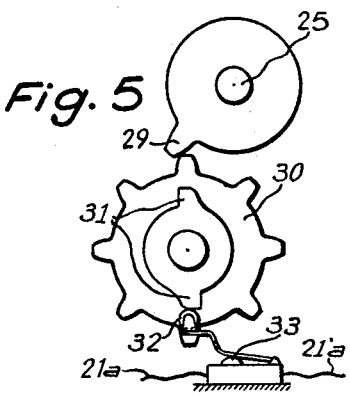
FIGURE 5 illustrates one form of timing device for controlling the respective durations of the transmission and silent periods.

It will readily be understood that for a given angular setting of drum 13, the leads 21a and 21b will continually be permitting the transmission of identical pulse trains representing in the selected code the course the ship is on, as indicated by course setter dial 1. The signals are then passed through a timing switch device 34 serving to control the transmission and silent periods, and one form of which will now be described with reference to FIGURE 5.

The timing switch unit shown comprises a first cam member secured on the drive shaft 25 of the rotary switch disc 16, and shown as having one cam finger 29 although more spaced fingers may be provided depending on the transmission rate desired. A sprocket gear 30 secured on a secondary shaft is positioned so as to be rotated by one step each time a tooth of the gear is engaged by the cam finger 29 in the rotation of the shaft 25. Rotatable with the gear 30 is a further cam 31 having cam projections adapted at predetermined positions of the cam 31 and gear 30 to depress a contact lever 32 thereby closing the switch 34 interposed in the lead 21a. It will be understood that by this means the repetitive train of coded pulse signals transmitted by the cooperation of the settable drum 13 and rotary switch disc 16 can be chopped into a desired time pattern including transmission periods and intervening silent periods the respective durations of which are determined by the geometrical characteristics of the cams used in the timing device just described. One at least of said cams, e.g. the cam 31, may be made removable and readily replaceable to vary said time pattern if desired.

The resulting timed signals are then applied by way of any suitable amplifier device 35a to an antenna device 36. This antenna according to the invention has associated with it means for adjustably limiting its transmission range. FIGURES 6 to 11 illustrate various forms of such antenna systems suitable for the purpose of the invention.

Figure 6:
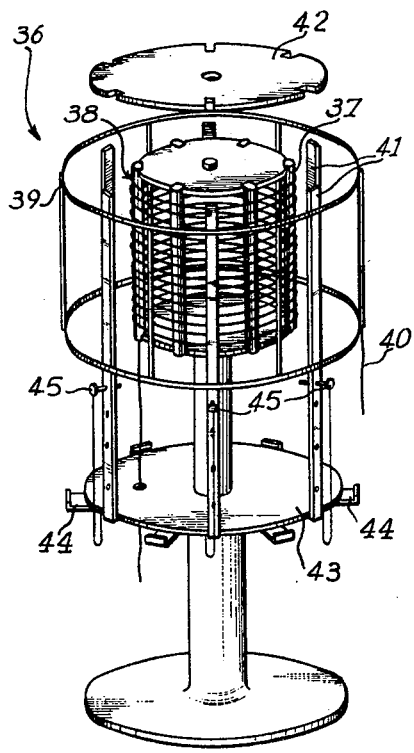
FIGURE 6 is a perspective view of a vertical transmitting antenna system according to the invention provided with an adjustable screen for adjustably limiting the transmission range.
Figure 7:
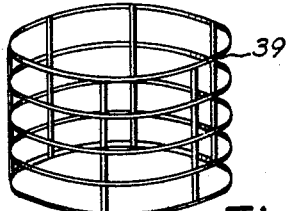
FIGURE 7 illustrates a modified form of antenna screen.

The antenna shown in FIGURE 6 includes a vertically mounted antenna of the squirrel-cage type including the uprights 37 having a conductor 38 helically wound around them. An electrostatic screen 39 surrounds the antenna coaxially in radially spaced relation with it. This screen may comprise a set of vertical metallic strips interconnected by metallic hoops as shown in FIGURE 7. The screen is grounded by way of a ground conductor 40. The screen 39 may be positioned at any of various vertical positions so as to enclose a variable portion of the antenna 38 and thereby limit its range to a selected extent. For this purpose upper and lower circular flanges 42 and 43 are supported above and below the antenna coil 38 and are interconnected by spaced vertical bars 41. The bottom flange 43 is supported a sufficient distance below the base of the antenna coil to permit the screen device 39 being completely lowered to rest upon the brackets 44 so as to clear the antenna entirely for the maximum range of transmission thereof. The screen is supported at a selected vertical position on the bars 41 by means of pins 45 inserted into selected holes formed in said bars. In the uppermost position of the screen on the bars the antenna is completely surrounded laterally by the screen and the range is a minimum. More than one screen such as 29, e.g., two, may be provided if desired further to limit its range.

Figure 8:
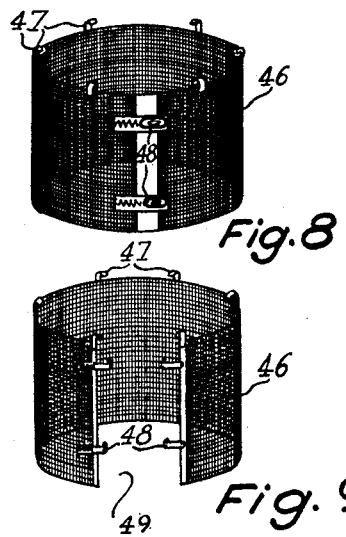
FIGURES 8 and 9 illustrate additional grid-like screens for limiting the antenna range.
Figure 9:
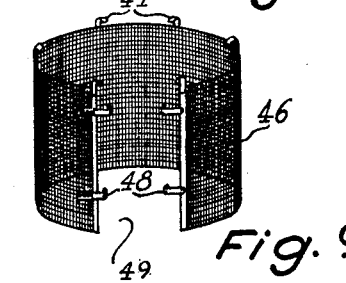

FIGURE 8 illustrates an additional or alternative grid-type screen 46 which may be placed around a frame such as 39 and suspended thereover by means of the hooks 47 engaged over the upper supporting hoop of the frame 39. The gridlike screen 46 is preferably provided with spring latching means 48 along its adjacent vertical sides. FIGURE 9 illustrates a similar grid-like screen which may be used for imparting directional characteristics to an antenna. The screen shown in that figure is similar to the grid in FIGURE 8 except that its angular extent is less so that with the spring latches 48 engaged over adjacent spaced uprights of the frame 39 an open section 49 is provided for directional operation of the antenna.

Figure 10:
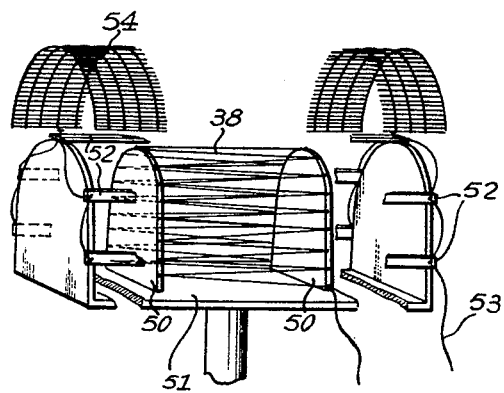
FIGURE 10 is a perspective view of a horizontal form of transmitting antenna.
Figure 11:
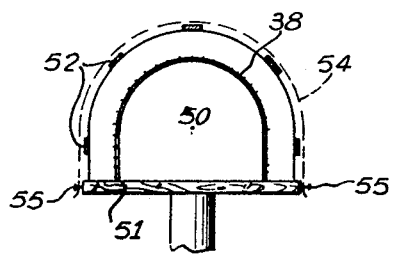
FIGURE 11 is a sectional view of the antenna of FIGURE 10.

FIGURES 10 and 11 illustrate a horizontal type of antenna comprising a flat base 51 having two spaced vertical plates 50 across which the conductor 38 is drawn in horizontal zigzags. The electrostatic screen is provided in the form of the horizontal metal strips 52 interconnecting a further pair of vertical flanges and all connected to the ground conductor 53. Alternatively metal hoops may be provided for quick removal of the screen. A grid-like screen 54 is positionable over the screen 52—53 and may be secured with spring-catches 55 engaging the base 51.

It will be understood that while only one basic form of embodiment has been described herein many other forms may be conceived within the scope of the invention claimed. Thus, the signal generating means instead of comprising conductive segments 15 cooperating with the contact brushes of the rotary switching disc, may utilize any alternative means for generating the code signal patterns, e.g. the code indicia may be magnetically recorded indicia and the brushes may then be replaced with magnetic reading heads. Or photoelectric means may be used, i.e. the code indicia on the drum 13 might be recorded as transparent patterns on an opaque background (or vice versa) and cooperate with photo-cell pickoff means on the rotary disc.

Further, it is not essential that the settable or indexable member 13 be provided in the form of the laterally concave drum shown. Instead of a plurality of similar code indicia being provided in each indexed band of the drum, as shown, each characteristic code pattern may be provided only once and this single code pattern may be repeatedly scanned by the pickoff device to provide the requisite train of identical signals. The pickoff device here shown as a rotary disc may itself be embodied in other forms.

What we claim is:

1. In a radiotelegraphic signalling system for aiding the navigation of craft at sea under conditions of low visibility, means for transmitting code signals from a craft comprising in combination; an automatic signal generator unit which comprises a signal generator for providing a continuous signal, a circular drum mounted for angular positioning about a longitudinal axis, said drum having a concave peripheral surface divided into a plurality of longitudinal bands coincident with compass courses, code indicia means indicative of the course represented by each said band placed respectively on said bands, a disc reader head mounted for continuous rotation in a plane extending through the axis of rotation of said drum and adjacent the concave peripheral surface of said drum, said disc reader head having a perimeter complementary and normal to said concave peripheral surface, and drum setting means for angularly positioning said drum around its longitudinal axis for a longitudinal band carrying the code indicia of the transmitting craft course to be opposite and normal to the perimeter of said disc reader head, means for continuously rotating said disc reader head, and reading means mounted on the perimeter of said disc reader head and connected to receive the continuous signal from the signal generator, for reading the code indicia on said opposite band as the disc reader head is rotating to continuously encode said received signal according to said code indicia; timing switch means connected to receive the continuous encoded signals from said reading means for chopping said continuous encoded signal into periodic signals; amplifier means connected to receive said periodic signals for amplifying said periodic signals to radio broadcast strength; and transmitting antenna means connected to receive said amplified signals for broadcasting, said transmitting antenna means comprising a frame, a conductor that constitutes the antenna proper externally supported on the frame, a cage means adjustably mounted to variably surround said conductor and grounded for variably limiting the distance of signal broadcast in accordance with the unsurrounded portion of said conductor, whereby periodic signals indicative of the course of the transmitting craft are broadcast for variably limited distances.

2. Means for transmitting code signals as described in claim 1 characterized in that drum setting means comprises a translucent disc mounted for rotation with said drum, the face of said translucent disc being engraved with a compass dial oriented to coincide with the code indicia carried by said longitudinal bands, a stationary reference marker mounted in the plane of rotation of said disc reader head parallel with and adjacent said translucent disc for indicating the craft course on said compass dial set to coincide with said marker, and a knob means mounted to rotate with said translucent disc and drum for manually rotating said disc and drum to set said craft course in coincidence with said reference marker.

3. Means for transmitting code signals as described in claim 1 characterized in that said cage means comprises a longitudinal frame, and a conductive grid attached to and longitudinally covering said frame, said grid defining a vertical slot for providing directional transmission of code signals through said slot.

4. Means for transmitting code signals as described in claim 1 characterized in that said time switching means comprises, a reduction gear train driven by said means for continuously rotating said reader head, a cam mounted for rotation and driven by said reduction gear train, a switch electrically connected between said reading means and said amplifier means and mounted adjacent to said cam and operable thereby to successively open and close positions thereby periodically breaking the electrical connection between said reading means and said amplifier means.

5. Means for transmitting code signals as described in claim 1 characterized in that said reading means comprises pairs of brushes mounted equally spaced around the periphery of said disc and in contact with said drum read head, said brushes of each pair being mounted on the opposite faces of said disc reader head and insulated from each other, the brushes mounted on one face of said disc being connected to receive said continuous signal from said signal generator and the brushes mounted on the other face being connected to said timing switch means, said pairs of brushes being electrically connected by said code indicia as the brushes are carried over them by the rotation of said disc reader head.

References Cited in the file of this patent

UNITED STATES PATENTS

| | | |
|---|---|---|
| 784,393 | Grabosch | Mar. 7, 1905 |
| 894,318 | De Forest | July 28, 1908 |
| 1,638,417 | Sperry | Aug. 9, 1927 |
| 1,802,643 | Floyd | Apr. 28, 1931 |
| 1,983,079 | Hansen | July 28, 1934 |
| 2,528,543 | Peterson et al. | Nov. 7, 1950 |
| 2,532,919 | Johnson | Dec. 5, 1950 |
| 2,575,342 | Gridley | Nov. 20, 1951 |
| 2,782,400 | Van Krevelen | Feb. 19, 1957 |
| 2,855,585 | Quinby | Oct. 7, 1958 |